UNITED STATES PATENT OFFICE.

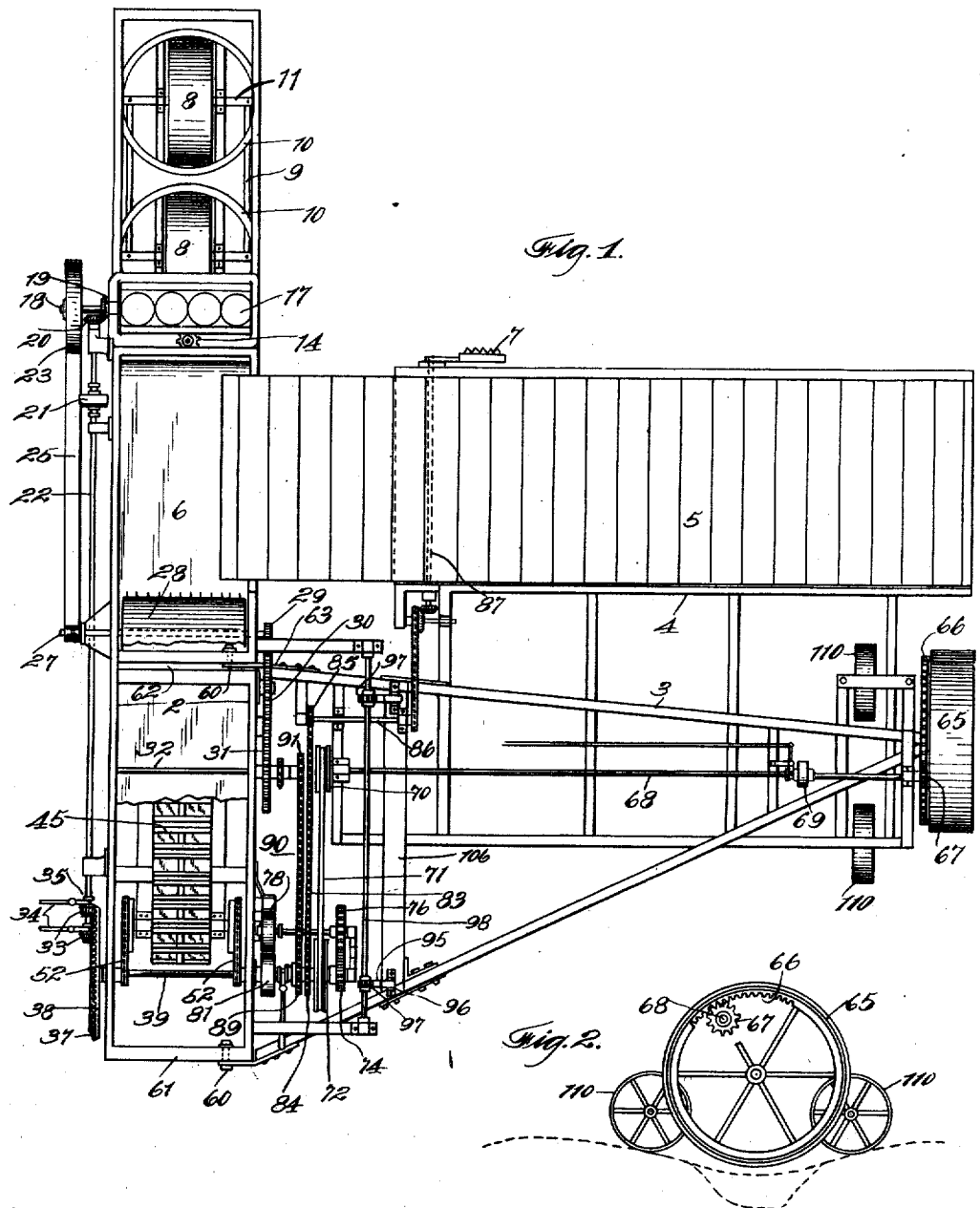

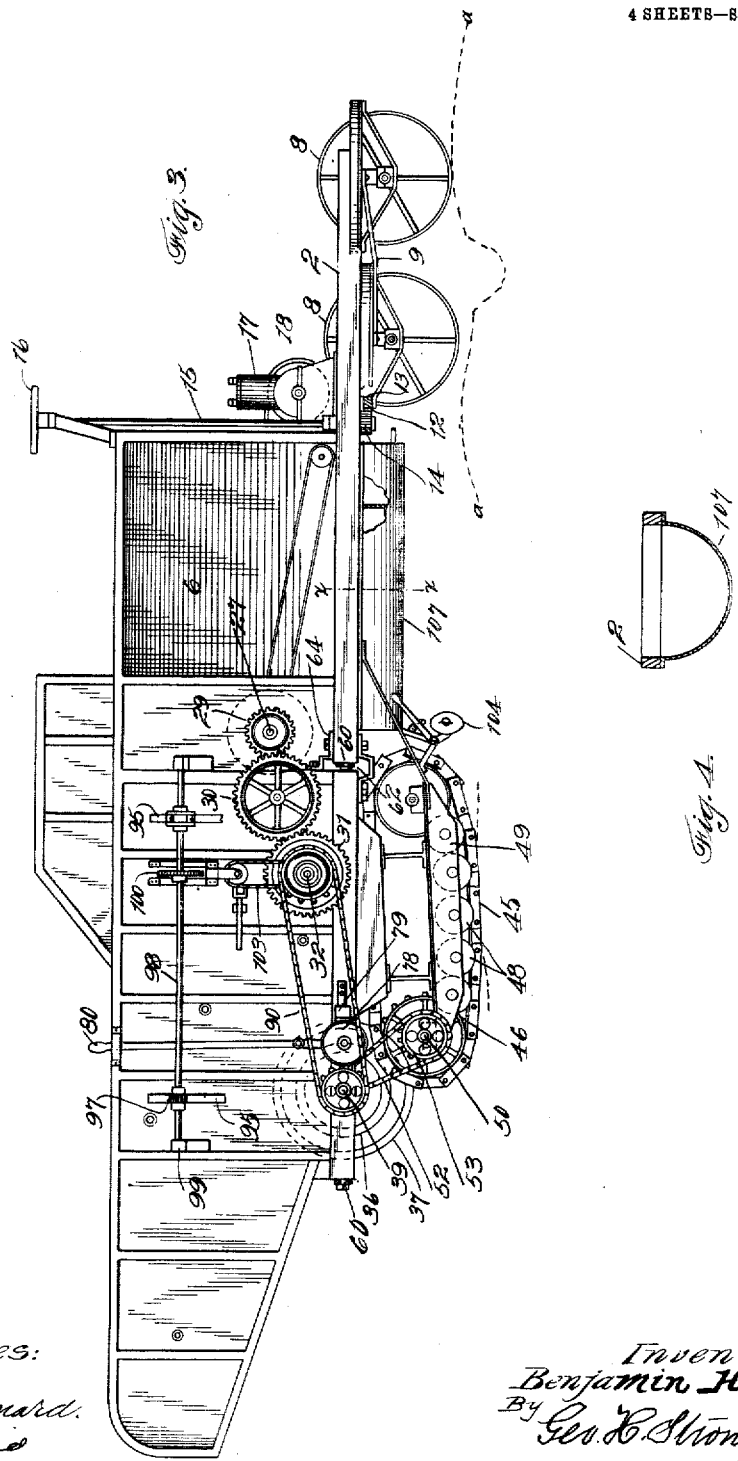

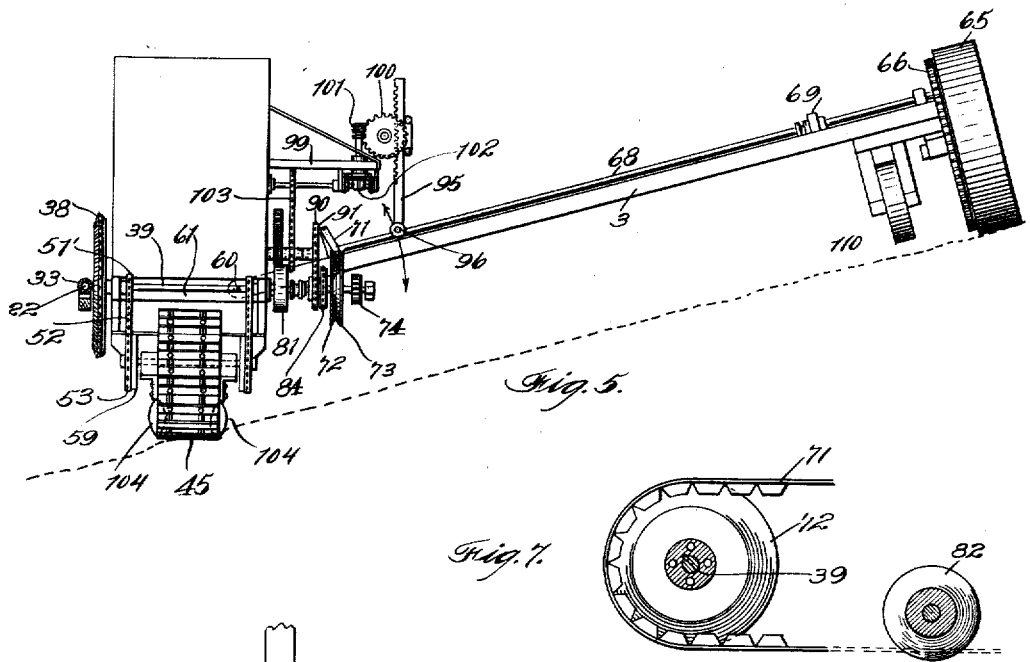
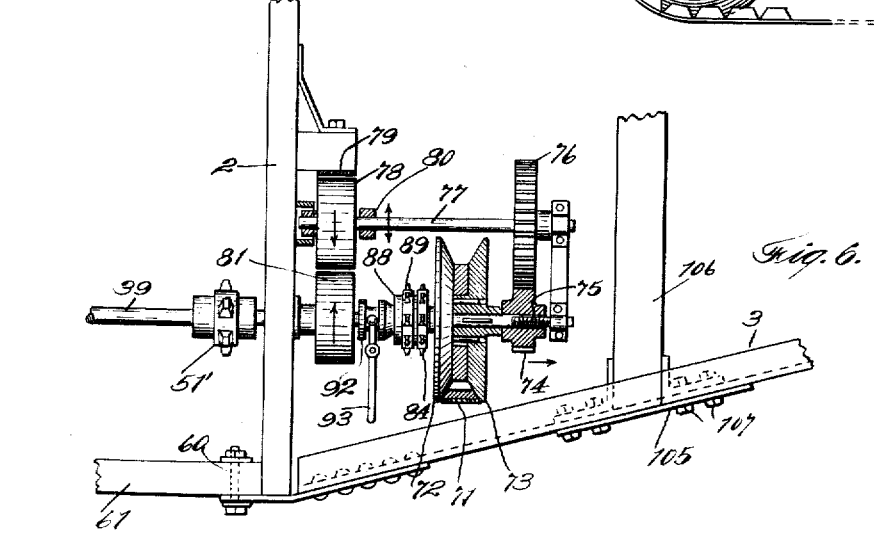

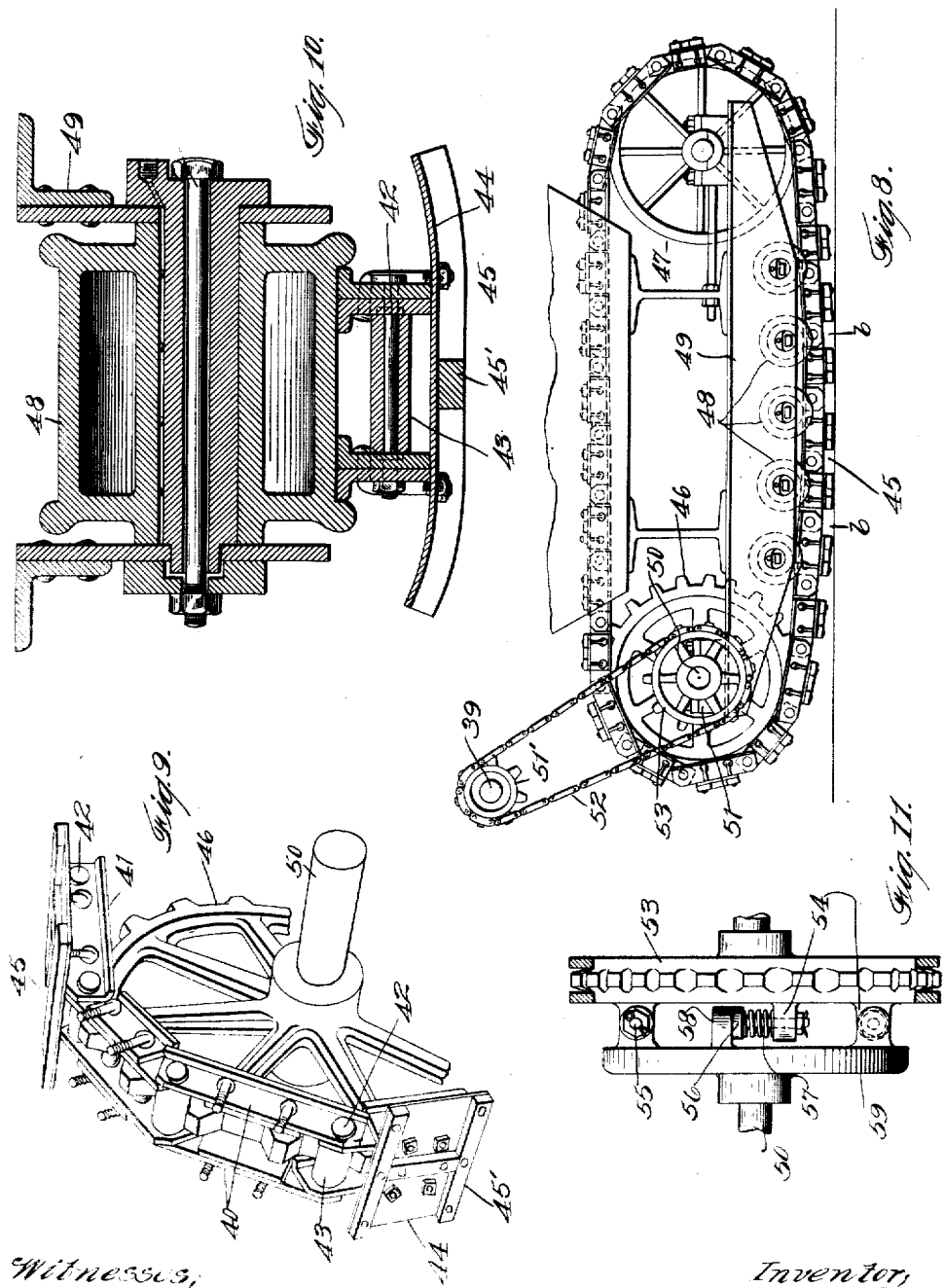

BENJAMIN HOLT, OF STOCKTON, CALIFORNIA.

HARVESTER.

954,394.  Specification of Letters Patent.  Patented Apr. 5, 1910.

Application filed December 22, 1908. Serial No. 468,732.

*To all whom it may concern:*

Be it known that I, BENJAMIN HOLT, citizen of the United States, residing at Stockton, in the county of San Joaquin and State of California, have invented new and useful Improvements in Harvesters, of which the following is a specification.

My invention relates to harvesters and particularly to grain harvesters in which a threshing, separating and cleaning apparatus, has flexibly connected with it a sickle or cutting mechanism, and means to deliver the cut straw and grain to the thresher, the whole being mounted upon wheels and capable of being propelled about a field, and to complete its work while traveling.

My invention consists in a novel means of mounting and connecting the separator and header mechanisms, in combinations of parts, and in details of construction which will be more fully explained by reference to the accompanying drawings, in which—

Figure 1 is a plan, with housing removed. Fig. 2 is an end view of the header frame, showing the bearing wheels. Fig. 3 is an elevation of the header side of the thresher. Fig. 4 is a detail section on line $x$—$x$ Fig. 3. Fig. 5 is a rear elevation of the machine. Fig. 6 is a detail of the header frame wheel-drive. Fig. 7 is a sectional view of the speed-changing pulley. Fig. 8 is a side elevation of the traction platform. Fig. 9 is a perspective showing the traction sprocket and chain. Fig. 10 is a cross section of the traction chain and journal-rollers. Fig. 11 is a detail of the cushion-drive.

It is well known that harvesting machines combined with threshing mechanism will satisfactorily perform their several functions so long as the body of the thresher remains approximately horizontal.

My present invention is an improvement in such apparatus, in which a single line of support for the separator is employed, and includes an extended bearing surface without increasing the height of the machine above the ground, and a superior application of tractional force.

It also includes improvements in steering, and other devices which will be more fully set forth in the following specification.

Referring to Fig. 1 of the drawings, the machine embodies the usual main-frame 2, the header-frame 3, draper-frame 4, draper 5, adapted to convey the cut grain into the feed-house 6, and the ordinary sickle 7. Turnably supported in frames projecting forward of the feed-house, are two steering-wheels 8 which are suitably connected, so as to be swung around in unison in the bearing rings 10, by links 9 pivoted upon the braces 11 of the wheels. One of the wheels 8 has gear-teeth 12 cut on its turn-table 13, these teeth being engageable with a pinion 14 secured to the lower end of a shaft 15, manually operated and a hand-wheel 16 to turn the wheels 8 thus altering and guiding the direction of travel of the machine. The provision of a plurality of these steering-wheels not only aids in turning the machine, but prevents the up and down pitching of the separator as it runs over furrows or small hummocks, this being well illustrated by the position of the wheels 8 with relation to the dotted line $a$—$a$ Fig. 3, and graphically demonstrates that if only one wheel were used the front of the machine would dip the full depth of the hollow between the ridges, whereas by using two wheels, one or the other is practically always on the upper surface of a ridge. Obviously, both wheels 8 will contact when the ground is level.

While the machine is perfectly adaptable to be propelled by horse or other power, a motor 17 is mounted just in front of the feed-house, and its shaft 18 projects from the side sufficiently to carry a gear 19, meshing with another gear 20 coupled by a reversing clutch 21, to a countershaft 22; and also carrying the usual momentum-wheel connected by belt 25 to drive shaft 27 upon which the cylinder 28 is secured. As shown in Figs. 1 and 3, the shaft 27 extends through the right side of the housing, and has secured on its end a spur gear 29, driving through intermediate gear 30, a gear 31 secured upon the cross-shaft 32 and by which all of the separator, cleaner, re-cleaner and conveyer mechanisms, are operated.

Again referring to the plan view, it will be noticed that the countershaft 22, extending along the left side of the housing, has splined upon it bevel-pinions 33 each adapted to be slid, by suitable levers 34 and collars 35, into and out of engagement with gear-teeth 36—37 cut on the wheel 38, fast on a shaft 39, mounted upon the sill 2. By forming a series of concentrically arranged gears 36—37 upon the wheel 38, it is possible to vary the speed of the shaft 39, without reference to the engine 17, and when necessary, the direction of rotation of the shaft 22, and its correlated members may be either reversed, by the clutch 21, or disconnected from the engine.

It is upon the traction means of this machine, with regard to its location, construction and driving means, that I wish to lay especial stress and claim: the device comprising a series of links 40 pivotally connected in train and forming chains 41, transversely united by the pivots 42, upon which are loose rollers 43 (see Figs. 9 and 10). Bolted across the parallel and adjacent links 40 are removable plate-shoes 44 of any desirable width, length and thickness, and which may have, secured on the exposed surfaces, grouser-like attachments 45' of any suitable shape. These combined parallel chains and shoes form what might be termed a "platform" 45 adapted to support the load of the vehicle, and to be given a circuitous travel by a driven sprocket 46 around a suitably spaced direction pulley 47, and a series of supporting rollers 48, journaled upon side beams 49 secured beneath the sills 2. The sprocket-wheel 46 is fastened upon a shaft 50, rotatable in boxes 51 bolted upon the beams 49, the shaft 50 being driven by suitable connections with the above mentioned shaft 39. These connections consist in the present case of sprocket-wheels 51' fast on shaft 39, by which power is transmitted through chains 52 to sprocket-wheels 53, loose on the shaft 50.

For the purpose of relieving the propelling mechanism of undue strains and jolts, lugs 54 project sidewise from the sprockets 53, and slidably mounted in each lug is a pin 55 having a head 56 between which and the lug is a heavy spring 57 surrounding the pin. The rotation of the sprocket 53 causes the pin-heads 56 to engage complementary dogs 58 formed upon the sides of a disk 59 rigidly fastened on the shaft 50. Since each sprocket 53 is in this manner yieldingly effective to turn the shaft 50, it is obvious that the heavy vibrations and strains are absorbed by the cushion-like drive and that when, for any cause, the tension becomes particularly severe on one or the other of the chains 52, the springs 57 will yield until the strain is equalized by the other chain.

The great advantage gained by using a traveling traction member of platform-like structure is self-evident, and briefly stated is mainly due to the benefit derived by the much larger area of ground contact which not only prevents slipping, but in the construction shown, and placed as it is approximately under the center of the housing, it affords a very steady bearing, and is consequently conducive of better separation of the grain.

In Fig. 8 are shown five of the bearing-rollers 48, the central three being disposed in one plane, and the end rollers slightly higher, so that the platform 45 is gradually directed from the straight line b—b, which forms the main bearing contact, off toward the sprocket 46 and pulley 47.

The header-frame 3, of the usual triangular shape, is pivoted at its inner side, to the thresher frame by pins 60. Preferably these pins are inserted in the cross ties 61, and near the inside sill 2, which is separated at 62 to permit the arm 63 of the header frame 3 to play; the sill being united above and below by straps 64. The outer end of the header-frame is supported upon a bearing-wheel 65, having secured to its inner side an internal gear 66, meshing with a pinion 67 carried by shaft 68, which is driven by a flexible driving means from the shaft 39, at the rear end of the thresher housing.

It is of importance, in a machine of this class, to have the header wheel positively driven, especially when a heavy grain is being harvested upon hillsides. It not infrequently happens when a heavy load is accumulated upon the draper, that much difficulty is experienced in keeping the machine headed straight, and this is particularly true when operating over rolling ground.

The shaft 68, seen in Fig. 1, is properly journaled upon the frame 3, and provided with a friction clutch 69, operable from any desirable position on the thresher; the inner end of the shaft 68 having secured to it a V-faced pulley 70 driven by a belt 71 from an adjustable V-pulley 72 carried by the shaft 39. The object of providing the adjustable pulley 72 is to enable the operator to vary the speed of the bearing-wheel 65 when the machine is making a turn, with the wheel 65 outside. The clutch 69 permits the wheel to be uncoupled from the driving shaft 68 when the machine is to be turned, using the wheel 65 as a pivot, and the thresher being propelled around upon its traction platform 45.

Any suitable means may be utilized for varying the speed of the shaft 68, and whereby it may be flexibly connected to a driving shaft. The pulley 72 supplies a simple means of accomplishing this, by separating the slidable member 73 from its coordinate section 72 (see Figs. 6—7) which allows the belt 71 to assume an arc of smaller radius on the V-shaped periphery of the pulley 72, resulting in a decrease in the speed of travel of belt 71 and rotation of pulley 70.

For the purpose of actuating the slidable, splined pulley-section 73 upon its shaft 39, a small gear 74 is threaded to turn upon a fine thread screw 75 turned on shaft 39. A gear 76, secured upon a spindle 77, meshes with the pinion 74, and when the spindle 77 is held against rotation by the engagement of its brake-wheel 78, with a fixed shoe 79 on the thresher sill 2, the gear 76 locks pinion 74 against turning, and the continued forward revolution of shaft 39 causes the pinion to advance along the screw 75 (here shown as left-hand) thereby forcing the section 73 toward the keyed pulley 72 expanding the belt 71 to a larger peripheral seat in the V groove between the pulley sections, and increasing the speed of the belt and the driven pulley 70.

When the operator wishes to decrease the speed of wheel 65, he grasps lever 80 by which the brake-wheel 78 may be made to contact with another wheel 81 secured on shaft 39. These wheels 78—81 may be of the same diameter, which would thus cause the spindle 77 to have a speed equal to that of shaft 39. Now the gear 76 which is secured on spindle 77 is preferably much larger than pinion 74, consequently this will be rotated faster than the shaft 39, upon which it is screwed, and is therefore unscrewed from engagement with pulley sections 73 allowing this to slide away from section 72 and enlarge the V-groove whereupon the belt 71 will be permitted to come closer to the center of pulley 72, resulting in a reduction of speed of the belt. Obviously the means connecting the shaft 68 to the driving-shaft on the thresher-body, must be sufficiently flexible to permit the header frame 3, and shaft 60 to freely tilt upon its pivots 60. When the lever 80 is shifted to a central position, the brake-wheel 78 becomes disengaged from the driving-wheel 81 and the shoe 79, and remains in a neutral position until again shifted by the operator. While the wheel 78 is in this neutral position, the gears 74—76 being in mesh constantly, continue to revolve without affecting the relation of pulley sections 72—73, and it is only when the actuator wheel 78 is thrown into engagement with either shoe 79 or wheel 81 that the gear 76 has an operative effect upon pinion 74.

A tension idler 82 is shown in Fig. 7, effective to take up slack in belt 71 during the tilting of the header-frame 3.

In Fig. 1 a chain 83 is illustrated as being driven by a sprocket 84, on shaft 39, and leading over another sprocket 85, on shaft 86 mounted upon the header-frame 3. From this shaft suitable connections are made to the draper and cutter driving shaft 87. The sprocket 84 is secured to a sleeve 88 (Fig. 6) which also carries another sprocket 89, from which a chain 90 runs over a driving sprocket 91 fast on the cross-shaft 32. When the machine is working down-hill, the chain 90 is linked in place, and the sleeve 88 uncoupled from shaft 39 by any simple clutch, such for instance as 92, splined upon the shaft and actuated by the lever 93 (Fig. 6). In this way the energy developed by the machine's momentum is utilized to operate the header, draper and cutters, and threshing mechanism, thus measurably unloading the engine 17, which may be uncoupled by clutch 21 on shaft 22. In ordinary work upon nearly level or up-hill ground, power is transmitted from the engine through shafts 22 and 39 and intermediate gears to directly drive the header mechanism, but if a sufficient down grade is encountered, the sleeve 88 is thrown out of action, and the chain 90 which is conveniently located, is placed upon its sprockets. The power is thus transmitted from the traveling platform to the shaft 39 thence through the chain 90 to the header actuating mechanism. As soon as the harvester is again working on level ground, the chain 90 is removed, the sleeve 88 again coupled by clutch 92 to shaft 39, and the engine again coupled at clutch 21.

Any suitable, practical device may be employed for connecting the header-frame 3 to the thresher body, so that it may be raised or lowered and locked; and in Figs. 1, 3, 5, I have shown rack bars 95 pivoted at 96, to the frame 3, and the upper ends engaging pinions 97, fastened to a horizontal shaft 98, journaled upon projecting brackets 99. The shaft 98 has secured to it a worm-wheel 100, meshing with a worm or screw 101, which is adapted to be turned in either direction by a gear-set 102, actuated by a sprocket and chain connection 103, with the cross shaft 32.

In Figs. 3–5 are illustrated colters 104 disposed upon the frame on each side, and just in advance of the forward end of the traction platform 45; the purpose of these colters being to make a preliminary cut, when the machine is working on a hillside, and throw some earth down in such a manner that the following platform will have a more or less horizontal path in which to run, since the colter on the uphill side will cut a small furrow approximately in line with the edge of the platform as shown in Fig. 5.

Beneath that portion of the main frame 2, adjacent to the feed-house 6, is secured a semi-cylindrical metallic receptacle 107, in which may be carried supplies, such as oil, gasolene, water, in separate compartments.

But particularly this structure forms a rigid brace between the longitudinal members of the sill frame, greatly strengthening the machine as a whole and dispensing with the usual braces required, and is much lighter.

Usually machines of this character are so broad when the header frame is in extended position, that it is necessary to disconnect the header when the machine is to be moved from place to place over country roads. I have provided means whereby the frame 3 may be shortened without requiring to be dismounted from its pivots. This means comprises perforated plates 105 (Figs. 1-6) secured to the outer rails of the header frame 3, and removably fastened to the short frame 106 by bolts 107. Preferably the bearing-wheel 65 is then removed from the frame 3, and mounted upon frame 106, which it will support.

Some sections of the country are subject to heavy rains, and in many instances the soil is soft, light and deep, and there is a strong tendency of the water to form gullies and washes in the soil. This is especially true as regards hillsides, and the provision of a machine embodying constructive features and relation of parts to overcome such difficulties with advantageous results, is important.

I have shown in Figs. 1 and 2 a plurality of auxiliary bearing-wheels 110 suitably mounted proximate the outer end of the header-frame 3; the purpose of these bearing wheels being to prevent the header-frame from constantly having an undulating motion when the ground is much furrowed or gullied. It will be noticed in Fig. 2 particularly that these wheels 110 will normally travel upon the summits of the furrows in the soil, and prevent the main wheel 65 from descending into the bottom of each of the gullies as the machine is advanced. This is an important feature as it assists in relieving the header-frame from severe strains due to the ditching of the bearing-wheel 65. Obviously, the auxiliary wheels 110 being mounted so that the bottom faces are slightly above the bottom plane of the wheel 65, these wheels will be idle when the harvester is being run over approximately smooth ground.

Having thus described my invention, what I claim and desire to secure by Letters Patent is—

1. A combined header and separator the header being hinged to the separator, said machine including an endless narrow flexible traveling support beneath the separator, and an independent support for the header.

2. A combined header and separator the header being hinged to the separator, said machine including an endless flexible traveling support beneath the separator and means carried by the header to maintain the separator vertical.

3. A combined header and separator the header being hinged to the separator, said machine including a main frame, a motor thereon, an endless, flexible and traveling support beneath the separator, mechanism by which power is transmitted from the motor to said endless support, and a supporting wheel carried at the outer end of the header.

4. A combined header and separator, the header being hinged to the separator, a motor, an endless, flexible support beneath the separator, driving connections between the motor and the endless support, a plurality of steering wheels arranged in the line of travel of the flexible support, and means whereby said wheels may be turned in unison about vertical axes.

5. A combined header and separator the header being hinged to the separator, said machine including an endless, flexible, traveling member located beneath the separator, longitudinally alined steering wheels at the front of the machine, connections by which said wheels may be turned in unison, and a bearing member at the outer end of the header.

6. A combined header and separator, the header being hinged to the separator, said machine including a main frame, a driving shaft thereon, means for operating said shaft, a longitudinally disposed flexible traveling support beneath the separator, a support for the outer end of the header, means including a driven shaft for positively driving said header support, and a flexible connection between the driving shaft on the main frame and the shaft which operates the header support.

7. A combined header and separator, the header being hinged to the separator, said machine including a driven supporting wheel at the outer end of the header, and supplemental bearing wheels arranged tandem with one on each side of the axis of the first-named wheel, contiguous to and in a plane parallel to the plane of said first-named wheel.

8. A combined header and separator, the header being hinged to the separator, said machine including an endless, flexible traveling support located beneath the separator, a support for the outer end of the header, a main frame, a motor thereon, means for transmitting power from the motor to the endless traveling support, concentric bevel gears and co-acting pinions, and means to independently engage the pinions with their gears.

9. A combined header and separator, the header being hinged to the separator, said machine including a single, longitudinally disposed, flexible, endless traction member located beneath the separator, a wheel support for the outer end of the header, mechanism through which motion is transmitted to said support and traction member, and mechanism by which the speed of the wheel support of the header may be varied.

10. A combined header and separator the header being hinged to the separator, said machine including an endless flexible supporting traction member beneath the separator, a motor on the machine, means for transmitting power from the motor to said traction member, a counter-shaft, connections therefrom to operate the header and separator, and sprocket wheels and chain to transmit power from the endless supporting traction member to said counter-shaft.

11. A combined header and separator the header being hinged to the separator, said machine including an endless, narrow, flexible traveling traction member beneath the separator, a motor, a steering mechanism, a shaft, a sprocket wheel secured on said shaft and engageable with said traction member, contact members secured on said shaft, loosely mounted driven members mounted on the shaft, and resilient means carried by said driven members whereby the contact members are driven.

12. A combined header and separator the header being hinged to the separator, said machine including an endless, narrow, flexible traveling supporting member located beneath the separator, a wheel for supporting the outer end of the header, means for transmitting power from the first-named supporting member to the header and separator, and means to yieldingly transmit power from said endless supporting member, said means including contact lugs and interposed springs.

13. A combined header and separator the header being hinged to the separator, said machine including a single, longitudinally disposed, endless, flexible traveling member located beneath the separator and forming a traction support, said header having a bearing wheel at the outer end, and means to drive said bearing wheel.

14. A combined header and separator the header being hinged to the separator, said machine including a single, longitudinally disposed, flexible traveling member located beneath the separator, a bearing wheel upon which the outer end of the header is supported, means to propel said wheel and means to change the rate of speed.

15. A combined header and separator the header being hinged to the separator, said machine including an endless, narrow, flexible traveling support beneath the separator, a bearing wheel upon which the outer end of the header is carried, means for connecting the header and separator whereby the two may be adjusted with relation to each other and locked, and driving means whereby power may be transmitted from the endless traveling support to drive the header bearing wheel.

16. A combined header and separator the header being hinged to the separator, said machine including an endless, narrow flexible traveling support beneath the separator, a bearing wheel upon which the outer end of the header frame is supported, mechanism whereby the relative angle of the separator and header may be adjusted, said mechanism comprising racks connecting with the header frame, a worm gear, pinions engaging the racks, and means by which the worm-gear may be rotated to maintain its engagement as the angle of the header and separator vary.

17. A combined header and separator the header being hinged to the separator, said machine including a single, longitudinal, traveling flexible bearing member located beneath the separator, a bearing wheel upon which the outer end of the header is supported, means by which power is transmitted to drive said bearing wheel, means by which the speed of said wheel may be varied, said means including a variable driving mechanism, and a clutch by which a driving means may be engaged or disengaged from said wheel.

18. A combined header and separator the header being hinged to the separator, said machine including a single, longitudinal, flexible traveling bearing member located beneath the separator, a motor carried on the separator, a bearing wheel for the outer end of the header, means by which power is transmitted from the motor to drive the endless traveling bearing member, means for transmitting power to drive the header supporting wheel, means by which the speed imparted to said supporting wheel may be changed, said last-named means including a drive shaft, concentric gears, pinions mounted upon said shaft adapted to engage with each of said gears, and means by which one of said pinions is disengaged when the other is thrown into engagement.

19. A combined header and separator the header being hinged to the separator, said machine including a single, longitudinal, flexible traveling bearing member located beneath the separator, a motor carried on the separator, means for adjusting the header relatively to the separator to maintain the separator approximately level, and earth-cutting devices carried in front of the flexible traveling bearing member.

20. A combined header and separator the header being hinged to the separator, said machine including an endless, narrow flexible traveling support located beneath the separator and forming a traction member, means for driving said support, a hollow trough-shaped structure extending between and having its edges secured to the separator frame, and a supplemental hinged frame.

In testimony whereof I have hereunto set my hand in presence of two subscribing witnesses.

BENJAMIN HOLT.

Witnesses:
GEO. H. STRONG,
DAN K. GILMORE.